United States Patent [19]
Kendall

[11] 3,732,944
[45] May 15, 1973

[54] AUTOMATIC VACUUM RESTRAINT APPARATUS

[75] Inventor: Giles A. Kendall, Burbank, Calif.

[73] Assignee: Menasco Manufacturing Company, Burbank, Calif.

[22] Filed: Apr. 12, 1971

[21] Appl. No.: 133,013

[52] U.S. Cl.............180/103, 280/150 B, 296/65 A, 297/216, 297/384
[51] Int. Cl..............................................B60r 21/10
[58] Field of Search....................280/150 AB, 150 B; 296/65 A; 297/216, 384, 390, 353, DIG. 3, DIG. 8

[56] References Cited
UNITED STATES PATENTS

| 3,409,326 | 11/1968 | Kerner | 280/160 SB X |
| 3,495,675 | 2/1970 | Hass et al. | 280/150 AB X |
| 3,406,774 | 10/1968 | Lacey | 180/96 |
| 3,137,523 | 6/1964 | Karner | 297/453 X |
| 3,622,974 | 11/1971 | Best | 280/150 AB |
| 3,627,345 | 12/1971 | Mire | 280/150 B |

Primary Examiner—Kenneth H. Betts
Attorney—Robert E. Geauque

[57] ABSTRACT

An automatic vacuum restraint apparatus to restrain the passengers of a vehicle wherein sensors are employed around the periphery of the vehicle structure to be capable of denoting an unstable condition, the sensors effecting actuation of the vacuum system within the vehicle to draw a vacuum between the body of each passenger and its respective passenger seat.

9 Claims, 6 Drawing Figures

PATENTED MAY 15 1973
3,732,944
SHEET 1 OF 3
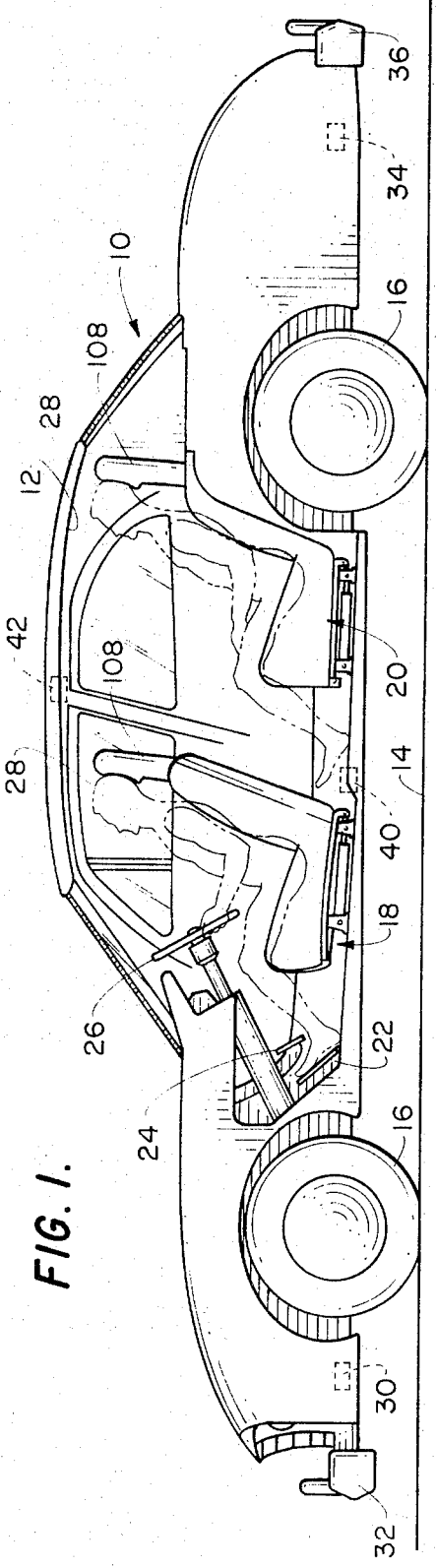
FIG. 1.
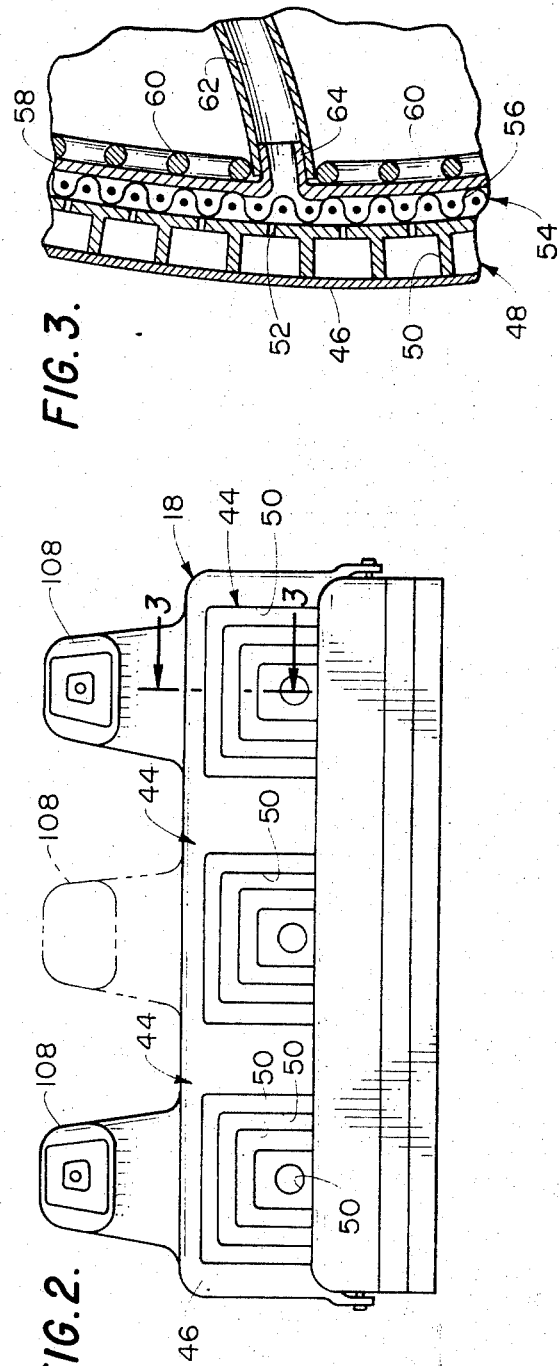
FIG. 3.
FIG. 2.
INVENTOR.
GILES A. KENDALL
BY
R. E. Geaugue
ATTORNEY

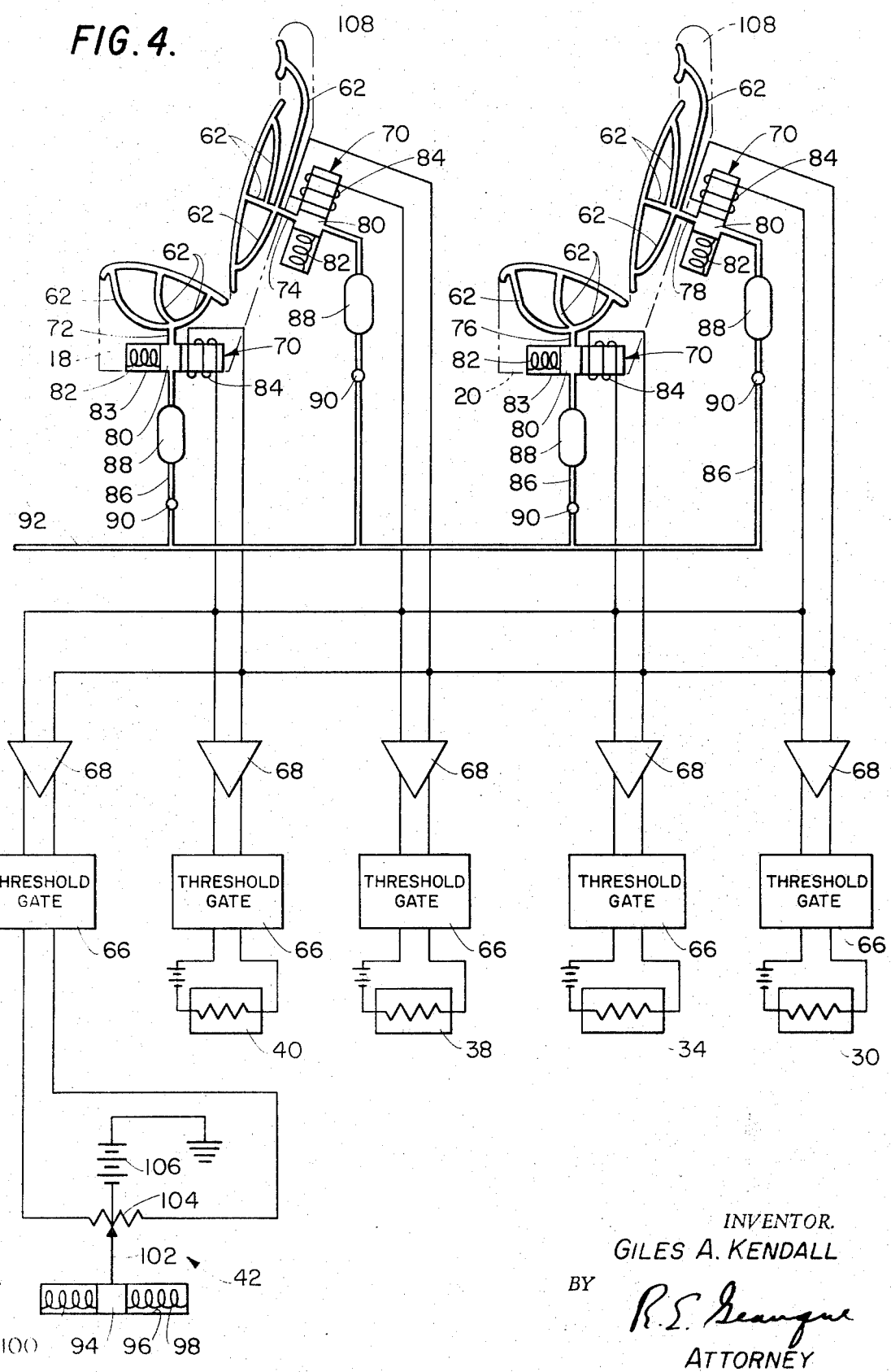

INVENTOR.
GILES A. KENDALL
BY
R. E. Geangue
ATTORNEY

AUTOMATIC VACUUM RESTRAINT APPARATUS

BACKGROUND OF THE INVENTION

The field of this invention relates to the restraining of passengers of a vehicle in a specific position during an unstable or crash situation, or, more particularly, to the preventing of injury to passengers of a motor vehicle during crash or roll-over.

Air vehicles and land vehicles have long been in common use as a means of transportation. Within both such vehicles it has been common to employ the use of a seat belt to restrain the passengers within the seats during a crash situation or in an unstable situation. It is the function of the seat belt to help protect the passenger from injury during the crash or unstable situation.

The normal roads and highways which have been designed for use by the automobile permit the vehicles to travel up to and even exceeding 70 miles per hour. Accidents with the automobile are extremely common and are the direct result of a substantial number of fatalities each year. It has been found that the operator or passengers within a vehicle sustain the major portion of their injuries due to either movement within the vehicle or being thrown exteriorly of the vehicle. In recent years, in an effort to hold the occupants of the vehicle within the seat during an accident, a seat belt and/or shoulder harness is employed around the body of each occupant.

Although such shoulder harnesses and seat belts have proved to be most helpful in decreasing injury and accidents, such require that the occupants connect the seat belt and/or shoulder harness upon effecting operation of the vehicle. For a reason that can best be described as human nature, people either tend to forget or neglect to connect such during the operation of the vehicle. Actually, surveys tend to indicate that passengers and the operators of vehicles only employ the use of seat belts and/or shoulder harnesses less than twenty-five percent of the operating time of the vehicle.

Within recent years, it has been envisioned that shoulder harnesses and seat belts can be done away with completely with an air bag system being substituted therefor. Basically, an air bag system is mounted within the vehicle, usually forward of the front seat and forward of the back seat. Upon the vehicle incurring a predetermined impact force, an actuation system is activated which causes the air bags to be filled and expand within the vehicle placing a large pillowy cushion around the occupants.

Although such an air bag system adequately protects the passenger and operator against potential injury in an accident, such systems are activated even in a very minor accident where such a system is not needed. Also, once the air bag has been actuated, it is normally required that the air bag assembly be taken to a skilled person who knows how to recollapse and rejuvenate the air bag actuation system and relocate such to be ready for the next activation.

It would be desirable to design a restraint system for passengers and the operator of a vehicle wherein the restraint system did not require to be connected or activated by any function of the operator or passenger, adequately protects the passengers and operator during an accident or unstable situation, and does not require any rejuvenation or replacement of structure after activation.

SUMMARY OF THE INVENTION

The automatic vacuum restraint apparatus of this invention is designed to be employed in conjunction with a vehicle structure such as an automobile. Each of the seats within the vehicle in which a passenger and the operator is to be seated is formed to include vacuum cups or chambers within the back portion and bottom portion of the seat. A source of vacuum is to be supplied for each passenger seat to be conductible into the vacuum chamber located in the back portion and bottom portion of the seat. Sensors are to be located adjacent the very front portion of the vehicle and the very back portion of the vehicle as well as adjacent the sides of the vehicle with an inertia sensor located in the top of the vehicle. The sensor note the initial stages of impact which result in activation of the vacuum system within the seats upon impact occuring. The inertia sensor upon initial roll-over of the vehicle similarly activate the vacuum systems within the seats. Also located within the seat structure are compressible solid dampers which permit the seat to move forward a certain amount if the force of impact exceeds a predetermined value. A damping unit is to be associated with the bottom of each seat and also with the tiltable back portion of each seat. This damping system keeps the occupants of the vehicle from incurring inertia forces over a predetermined value in a high impact situation, which would automatically cause significant damage to a person.

In a modification of the apparatus of this invention, a comfort system may be employed wherein such can be actuated by means of the braking force exceeding a predetermined amount, indicating an extreme fast stop situation. Upon the braking force exceeding a predetermined value, the vacuum can be supplied to the seats, as aforementioned, either wholly or partially.

BRIEF DESCRIPTION OF THE DRAWINGS

FIG. 1 is a cut-away view of an automobile within which is employed the apparatus of this invention;

FIG. 2 is a front view of a multiple passenger seat assembly incorporating the apparatus of this invention;

FIG. 3 is a cross-sectional view through the seat structure of this invention taken along line 3—3 of FIG. 2;

FIG. 4 is a diagrammatic representation of the overall system of the apparatus of this invention;

DETAILED DESCRIPTION OF THE SHOWN EMBODIMENTS

Figure 5:
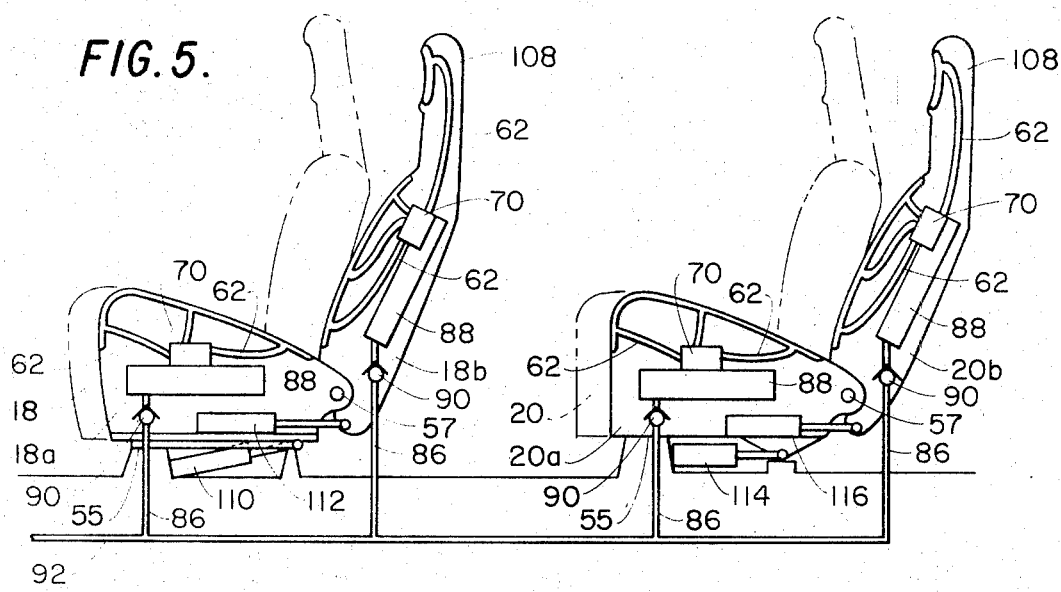
FIG. 5 is a diagrammatic representation of a dual seat arrangement incorporating both the vacuum system and the damping structure included within this invention.

Referring particularly to the drawings, there is shown in FIG. 1 a land vehicle 10 having a passenger compartment 12 and being adapted to move upon the ground 14 by means of wheels 16. Within the passenger compartment 12 is located a front seat 18 and a back seat 20. The vehicle also includes the conventional accelerator pedal 22, a brake pedal 24, and a steering wheel 26.

The restraining system of this invention depends primarily upon the time interval which occurs from initial impact of the vehicle to where the impact force is transmitted to the occupants 28 of the vehicle 10. In other words, if the vehicle 10 runs into an object with the front portion of the vehicle, it has been found that the front portion of the vehicle deflects or absorbs a portion of the impact force prior to transmission of the impact force to the occupants 28 of the vehicle. Normally, this time lag is greater than one-tenth of a second. Therefore, the system of this invention is designed to operate in one-tenth of a second or less.

To employ the use of this time delay, sensors are employed within the periphery of the vehicle 10. A front sensor 30 is located within the structure of the vehicle 10 adjacent the front bumper 32. A back sensor 34 is located within the structure of the vehicle 10 adjacent the back bumper 36. Side sensors 38 and 40 are located on each side of the vehicle. A roll sensor 42 is located within the top portion of the vehicle 10. It is to be understood that the placement of the sensors and the number of such sensors is considered to be a matter of choice or design and may be readily varied within the scope of this invention. For example, the roll sensor 42 need not be located within the top of the vehicle but may be located at any other portion of the vehicle. Also, the structure of the roll sensor 42 functions only when the vehicle begins to roll over. The structure depicted for the roll sensor 42 is only an example of numerous other types of structures which could be readily employed to depict roll.

Referring particularly to FIG. 2 of the drawings, there is shown the front seat 18 having three in number of occupant seats 44. Each of the occupant seats 44 are adapted to seat a single person therein. Although the occupant seats 44 are shown located within a single seat 18, it is to be understood that other types of seats could be employed such as what is termed a "bucket" seat which is a single seat structure for a single individual.

Each of the occupant seats 44 is to be covered with a decorative and porous upholstery 46. Located directly adjacent the upholstery 46 is an active layer 48 which is configured to provide vacuum chambers 50 which can act upon the occupant of the seat 44. The function of the active layer 48 is to provide a plurality of individual chambers 50 which are capable of reacting singularly to apply a vacuum to an occupant of the seat 44. The chambers 50 are shown configured in the shape of peripheral rectangles. However, it is understood that the chambers 50 could be any other configuration such as a suction cup or the like.

Within the back portion of the active layer 48 is a flow control orifice 52 which connects each chamber 50 with a plenum layer 54. A corrugated spring 56 is located within the plenum layer 54 and is adapted to maintain the plenum layer 54 open even when the occupant 28 is occupying the seat 44. In essence the spring 56 maintains the spacing between the back portion of the active layer 48 and the inner seat covering 58. Located interiorly of the seat covering 58 are the conventional seat springs 60. A conduit 62 is connected to a conduit fitting 64 of the seat covering 58. The conduit 62 is to connect a vacuum into the plenum layer 54.

It may be desirable in certain instances to employ a modification of the structure of the occupant seats 44.

For example, it is envisioned that the plenum layer 54 and the active layer 48 could be combined into a single layer. Also, the vacuum chamber 50 configuration could be widely varied, it only being necessary that a low pressure zone be created between the passenger 28 and the seat 18.

Referring particularly to FIG. 4 of the drawings, the sensors 30, 34, 38 and 40 are shown to be of the conventional strain gauge construction. Basically, the function of the strain gauge is that upon impact of the vehicle and fracturing of the vehicle structure, the electrical resistance of the strain gauge will vary. This variation in resistance is picked up by a threshold gate. Basically, the treshold gate 66 functions to transmit a signal only upon a predetermined amount of variation in resistance. The signals from the threshold gates 66 are then transmitted to an amplifier 68. The amplified signal from the amplifier 68 is then transmitted to effect operation of a solenoid valve 70.

It is to be noted that there are two solenoid valves 70 for each occupant seat 44. In other words, a vehicle which is designed for six passenger will have twelve in number of such solenoids 70. Each solenoid 70 of the bottom portion of each occupant seat 44 are connected through a main conduit 72 to the branch conduits 62 within the front seat 18. Each solenoid 70 of the back portion of each occupant seat 44 is connected through a main conduit 74 to the branch conduits 62 within the front seat 18. It is to be understood that for the front seat 18 of FIG. 2, there would be three separate solenoids 70 for the bottom portion thereof and there would also be three solenoids 70 employed for the back section of the front seat 18.

A similar arrangement is employed with respect to the back seat 20 wherein a solenoid valve 70 is connected through a main conduit 76 to within the bottom portion of each occupant seat 44 within the back seat 20. Conduit 76 is connected to conduits 62 in the same manner. Also, a solenoid 70 is connected through main conduit 78 to each of the branch conduits 62 within the back portion of each occupant seat 44 within the back seat 20.

Each of the solenoids 70 includes a piston valve 80 which is supported in a cylinder 83 and biased to closed position by spring 82. A coil 84 is to be electrically connected to its respective amplifier 68 and, upon actuation thereof, is to effect movement of the piston valve 80 against the bias of the spring 82. Upon actuation of coil 84 and movement of the piston 80, air is permitted to be conducted from adjacent the surface of the occupant seat 44 through the conduits 62 and its respective main conduits 72, 74, 76 or 78, into a respective intermediate conduit 86 containing an accumulator 88. Each of the intermediate conduits 86 are connected through a check valve 90 to a main supply conduit 92. The main supply conduit 92 is to be connected to a source of vacuum such as the engine vacuum of the vehicle itself.

It is to be understood that each of the sensors 30, 34, 38 and 40 are capable of effecting operation of all the solenoids 70. This is desired since the sensors 30, 34, 38 and 40 are each located in different parts of the automobile, and upon receiving an impact in one area of the automobile it is desired that all occupants of the vehicle be firmly retained within their seats.

It is to be noted that each of the sensors 30, 34, 38 and 40 are what is commonly referred to as deformation sensors in that they only activate upon deformation of the vehicle structure. Normally, upon deformation occurring in the area of one of the sensors 30, 34, 38 and 40, the activation of the solenoids 70 and restraining of the passengers within their seats is quick enough in time to be prior to the force of the impact being transferred to the occupants. However, an additional sensor 42 is employed which does not depend upon deformation. Sensor 42 is activated upon the car beginning to turn over and roll upon its top.

Sensor 42 may assume any of several configurations and may be composed of a piston 94 which is mounted within a cylinder 96 (see FIG. 4). The piston 94 is supported within the cylinder 96 by means of springs 98 and 100. The bias of the springs 98 and 100 is substantially in line and in opposite direction with respect to each other, thereby holding the piston 94 substantially in the center of the cylinder 96. A movable tap 102 is directly connected to the piston 94. The movable tap 102 is operatively connected to resistor 104 of a potentiometer assembly. Resistor 104 is also connected to a battery 106 which is located to establish vacuum potential at the mid-point of resistor 104. Thereby, if roll-over of the vehicle occurs, the inertia of the roll will cause piston 94 to move one way or another against the bias of either spring 98 or 100. In such an instance movable tap 102 will move along resistor 104 in a direction away from the reference potential established by battery 106. As a result, upon a sufficient change of the resistive value of resistor 104, activation of a threshold gate 66 occurs which in turn through an amplifier 68 effects actuation of the solenoids 70. It is understood that sensors 30, 34, 38 and 40 could be of the inertia type which senses a change in velocity along any axis of the vehicle rather than of the deformation type.

The operation of the vacuum vehicle restraint system of this invention is as follows: It will be assumed that the automobile has been caused to have an accident with the front portion of the vehicle causing deformation thereof. As a result of such deformation, the resistance within the strain gauge 30 has varied which upon reaching a predetermined value effects actuation of a threshold gate 66. The signal from the threshold gate 66 is transmitted through an amplifier 68 and effects operation of all the solenoids 70. As a result, simultaneous withdrawing of air adjacent each of the occupant seats 44 is accomplished by means of the air being transmitted within the accumulators 88 through conduits 62 and 86. The check valves 90 function to permit flow of air only toward the main vacuum conduit 92 and not in the reverse direction. If there is no person located within the occupant seat 44, upon activation of its respective solenoids 70, air is permitted to flow freely into main supply conduit 92. However, because of check valve 90, other seats where a person is sitting are unaffected in that the vacuum is permitted to accumulate within their respective accumulators 88.

The actual vacuum drawn against the person does not have to be substantial to retain the person within the seat during a high impact force accident. It has been found that 6 or 8 pounds per square inch under atmospheric pressure is adequate to retain a person within the seat during a high impact force situation. Also, it is noted that the head rests 108 apply a vacuum against the person's head as well as the vacuum being applied against his body. The vacuum will normally be maintained through a period of approximately 5 seconds and will gradually dissipate thereafter permitting the occupant to leave the seat. It is desired to restrain the occupant for a period of 5 seconds to protect the occupant in case the accident is of a roll-over type of accident.

The vacuum system of this invention also protects for side impact which is not possible in previously described air bag systems. It has been found that the system recharges itself automatically after use (within a period of about five seconds with the engine motor running). Additionally, within the vehicle, means could be employed upon the vehicle dash to check out the system to make sure that it is working properly.

It is to be understood that if the vehicle is struck from the rear that the sensor 34 will effect actuation of all the solenoids 70. If the system is struck from the sides, either sensor 38 or 40 will effect actuation of the system. If the vehicle is rolling over, than sensor 42 will be employed to actuate the system.

It has been found that optimum restraint will be employed with the volume of each of the tanks 88 having approximately 125 cubic inches. However, the size of each of the tanks 88 is considered to be a matter of choice or design and may be readily varied.

Another advantage of the apparatus of this invention is that it has been found to adequately protect a small child the same as a large adult. Because the area of the child is smaller than the adult, the child is not subjected to any greater restraint force than the adult.

Referring particularly to FIG. 5 of the drawings, the previously described system is shown incorporated within a front seat 18 and a back seat 20. However, it is contemplated that in certain instances a greater than average or greater than maximum desired impact force will be experienced by the vehicle. In such an instance it is desired to have the seats 18 and 20 themselves move so as to lower the impact force to which the occupant is being subjected. To accomplish such, the bottom portion 18 of the front seat 18 is slidably mounted with respect to the vehicle body on a track surface 55 and is normally restrained against movement by means of a first damping unit 110. The back 18b of the front seat is pivotally mounted to the bottom portion 18a by means of a pivot 57 and is normally restrained against movement by a second damping unit 112. Similarly the bottom portion 20a of the back seat 20 is slidably mounted with respect to the vehicle body and is normally restrained by means of a third damping unit 114, with the back portion 20b thereof being pivotally mounted with respect to the bottom portion 20a and normally restrained by means of a fourth damping unit 116. The damping units 110 through 116 may be of a pneumatic type of damper or possibly of a hydraulic type. However, it is contemplated by the applicant that a compressible solid spring damper with a preselected initial spring force may be particularly advantageously employed within this situation, such a damper being described in U.S. Pat. No. 3,053,526, issued Sept. 11, 1962. The desirable features of the compressible solid type of spring damping unit would be that the maximum energy absorption occurs per unit size, and also that after the damping movement, the seats will automatically return to their initial position.

As can be readily seen from FIG. 5 in the drawing as represented by the phantom lines, both the bottom portions of the seats are movable in a forward direction as is also both the back portions of the seat. It is in this direction that it is particularly desired to provide this additional impact absorption characteristic, as it is usually the forward direction where such a high impact force will occur. It is to be understood that the damping units 110, 112, 114 and 116 all operate independently of each other and it may be found in a given situation, due to the weight of specific occupants of the seat, that the front seat may move forward with the back seat standing still during an impact situation. It is additionally to be understood that the damping units only act upon the impact force reaching a predetermined level.

It is to be understood to be within the scope of this invention to employ a plurality of damping units for the bottom of each seat or the back of each seat, or to only employ a single damping unit. Such is to be considered a matter of choice or design depending upon the force requirements necessary and absorption characteristics of the damping units.

Figure 6:
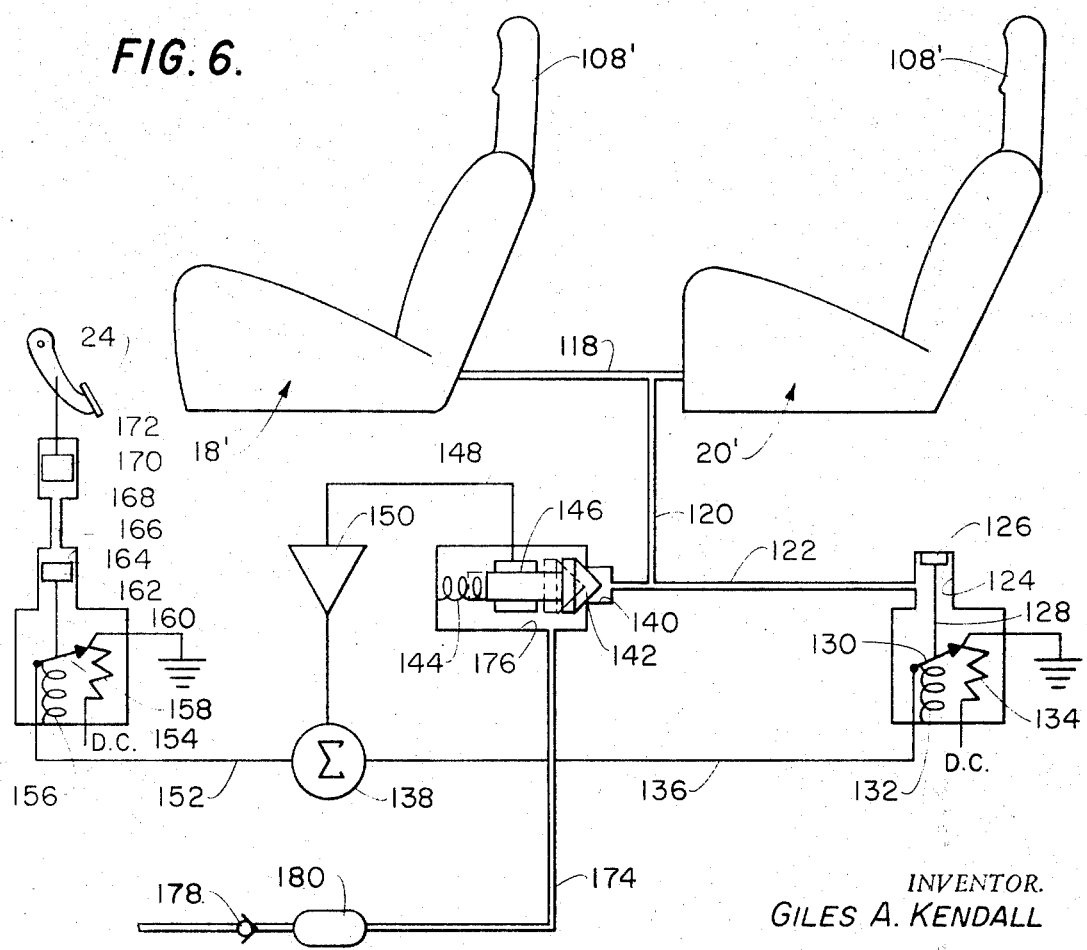
FIG. 6 is a diagrammatic representation of the comfort vacuum system employed in combination with the brake pressure of the vehicle.

Within FIG. 6 there is shown an optional comfort system which may be employed in combination with the previous structure, or employed individually, or employed in conjunction with the previous structure. Basically, in situations where it is necessary for the operator to brake the vehicle at an extremely rapid rate, a vacuum will be applied by the system of FIG. 6 to the occupant seats to firmly retain the occupants in position and prevent them from incurring any substantial injury. Also, in situations where impact is imminent and the operator of the vehicle has applied the brakes, the restraint will have been applied earlier than anticipated, negating the employment of the inherent time delay in the previous system.

It is to be understood that the seats 18' and 20' include a similar plenum layer to which the conduit 118 is capable of applying a vacuum. Intermediate conduit 120 is connected to the conduit 118 and also to connection conduit 122. One end of the connection conduit 122 cooperates with a cylinder 124 within which is a piston 126 connected to a piston rod 128 and piston 128 is connected to a pivotable tap 130. Tap 130 is biased by a compression spring 132 toward a first position and one end of the tap 130 is in movable contact with a resistor 134. The pivoted end of the tap 130 is connected through conductor 136 to an electrical signal comparing device 138.

The opposite end of the conduit 122 connects with a chamber 140 which is normally closed by means of solenoid plunger 142. Plunger 142 is normally biased to the closed position by means of a spring 144. A coil 146 surrounds a portion of the plunger 142 and is capable, upon being actuated, to move the plunger 142 against the biasing action of the spring 144. The coil is electrically connected by conductor 148 through an amplifier 150 to the comparing device 138.

Also, a conductor 152 is connected to the comparing device 138 and terminates at one end of the pivotable tap 154. The pivotable tap 154 is biased by a spring 156 also to a first position. The free end of the tap 154 is in movable contact with a resistor 158. A piston rod 160 is connected between the movable tap 154 and a piston 162. Piston 162 is movably mounted within a cylinder 164, with the open end of the cylinder 164 being connected through passage 166 to a second cylinder 168. Second cylinder 168 has movably mounted therein a piston 170 which is directly connected by piston rod 172 to the brake pedal 24.

A main vacuum conduit 174 is connected to the chamber 176 which contains valve 142 and the conduit 174 contains a check valve 178 and an accumulator 180. The function of the check valve 178 and the accumulator 180 is identical to the previous description relating to check valve 90 and the accumulator 88.

The operation of the comfort systems shown in FIG. 6 of the drawings is as follows: It will be assumed that the brake pedal 24 has not been actuated but that the vehicle is moving along the roadway without any need to apply the brakes. In such a position the movable tap 154 kicks off a reference voltage at the resistor 158 and transmits such to the comparing device 138. Also, the movable tap 130 kicks off a reference voltage at the resistor 134 and such is transmitted through conductor 136 to the comparing device 138. Since these voltages are equal, no signal is transmitted from the comparing device 138 through amplifier 150, and coil 146 remains unactuated, thereby positioning the plunger 142 to close off chamber 140. Air has been withdrawn through the check valve 178 from accumulator 180, main supply passage 174, and chamber 176 on the aft end of the plunger 142. It is to be noted that the size of the spring 144 is to be selected so that this vacuum will not remove the plunger 142 from it seat closing off chamber 140.

Let it be assumed that the operator of the vehicle compresses the brake pedal 24 a substantial amount. It is normally to be desired that the comfort system will not be actuated unless a substantial compression of the brake pedal 24 occurs. In other words, during normal driving situations no actuation of the comfort system will occur. After a predetermined amount of movement of the brake pedal 24, the fluid pressure transmitted by piston 170 to piston 162 effects movement of the movable tap 154 along the resistor 158 and a change in electrical signal is transmitted through conductor 152 to the comparing device 138. This signal is then compared with the signal being transmitted through conductor 136 denoting the position of the movable tap 130 with respect to resistor 134. At present, it is to be assumed that the movable tap 130 is still in the reference voltage position. As a result, a signal is emitted from the comparing device 138 through the amplifier 150 to actuate the coil 146. This actuation of coil 146 removes plunger 142 from its seat and opens the vacuum within chamber 176 and the accumulator 180 to conduits 122, 120 and 118. As a result, a removal of air occurs from between each occupant and the seat within which the occupant is sitting, tending to restrain the person within the seat.

Let it be assumed that the brake pedal 124 is applied in rapid succession, each time being applied vigorously. There may be a sufficient vacuum applied between each occupant and its seat to retain the occupant therein without requiring the need to apply additional vacuum. For this reason, the present vacuum which exists within each of the seats is measured through conduit 122 by means of piston 126. This vacuum tends to move piston 126 and the movable tap 130 against the bias of the spring 132. The amount of vacuum which is contained within the seats is directly proportional to the movement of the movable tap 130. Also, as a direct result, an electrical signal is being transmitted from resistor 134 through conductor 136 into the comparing device 138. This electrical signal is compared with the desired electrical signal from conductor 152, and from this comparison a need for the vacuum connection through valve 142 is determined. If it is found through the comparison that additional vacuum is required, an electrical signal will be transmitted from the comparing device 138 through conductor 148 and amplifier 150 to actuate the coil 146, thereby connecting the vacuum chamber 180 to the conduits 118, 120 and 122.

What is claimed is:

1. A restraint system for the passengers of a vehicle comprising:

first means located within the body structure of the vehicle to be capable of sensing an abnormal condition of the vehicle;

second means connected to an occupant seat within the vehicle to be capable of forming a fluid tight chamber means with a portion of the body of an occupant of said seat;

third means actuatable by said first means to connect a vacuum source with said chamber means; and said chamber means comprises an active layer formed into a plurality of individual chambers open at the side adjacent said body portion of the occupant, a plenum chamber located adjacent said active layer and connecting each of said individual chambers through an orifice arrangement, said plenum chamber having a biasing means located throughout to prevent closing of said plenum chamber, said third means comprising means for connecting said plenum chamber to said vacuum source for pulling the body portion of the occupant against said active layer and substantially closing the open side of at least some of said individual chambers.

2. A system as defined within claim 1 wherein:
therebeing a plurality of individual occupant seats within said vehicle, therebeing a separate vacuum source for each of said individual occupant seats.

3. A system as defined within claim 1 wherein:
said third means comprises means for sensing the magnitude of said signal and applying said vacuum source upon said signal reaching a predetermined magnitude.

4. A system as defined within claim 3 wherein:
said third means comprises an electrical signal operated solenoid valve, said solenoid valve upon being actuated by said first means connecting said vacuum source to said chamber means.

5. The system as defined in claim 1 wherein:
said plurality of individual chambers comprises at least a first chamber and a second chamber, said second chamber being located entirely about said first chamber.

6. A restraint system for the passengers of a vehicle comprising:

first means located within the body structure of the vehicle to be capable of sensing an abnormal condition of the vehicle;

second means connected to an occupant seat within the vehicle to be capable of forming a fluid tight chamber means with a portion of the body of an occupant of said seat;

third means actuatable by said first means to connect a vacuum source with said chamber means;

said first means transmits a signal to said third means in response to an impact force upon said vehicle causing said vehicle to change speed or direction; and fourth means connected with said seat to permit movement of said seat upon said impact force exceeding a predetermined level.

7. A system as defined within claim 6 wherein:
said fourth means comprises a first damping unit connected to the bottom portion of said seat and a second damping unit connected to the back portion of said seat, said first and second damping units being connected to said body structure of said vehicle.

8. A restraint system for the passengers of a vehicle comprising:

first means located within the body structure of the vehicle to be capable of sensing an abnormal condition of the vehicle;

second means connected to an occupant seat within the vehicle to be capable of forming a fluid tight chamber means with a portion of the body of an occupant of said seat;

third means actuatable by said first means to connect a vacuum source with said chamber means; and said vehicle having a braking system to be selectively operated by an operator to stop or slow said vehicle, said first means being actuatable by operation of said braking system to obtain a predetermined degree of braking.

9. A system as defined within claim 8 wherein said third means comprising comparator means for comparing in a single instance the desired level of vacuum within said chamber means with the existing level of vacuum within said chamber means, said comparator means closing said connection to said vacuum source when said two levels are substantially the same.

* * * * *